United States Patent [19]

Hansen

[11] Patent Number: 4,524,746
[45] Date of Patent: Jun. 25, 1985

[54] CLOSED CIRCUIT FUEL VAPOR SYSTEM

[76] Inventor: Earl S. Hansen, P.O. Box 925, Willits, Calif. 95490

[21] Appl. No.: 598,364

[22] Filed: Apr. 9, 1984

[51] Int. Cl.³ .................... F02M 31/00; F02M 27/08; B05B 17/06
[52] U.S. Cl. .................................. 123/538; 123/537; 123/545; 261/DIG. 48
[58] Field of Search ............ 123/523, 538, 537, 25 A, 123/590, 536, 545, 546; 261/81, DIG. 48, 144, 145, 18 A, DIG. 39, DIG. 57

[56] References Cited

U.S. PATENT DOCUMENTS

| | | | |
|---|---|---|---|
| 1,285,068 | 11/1918 | Detwiler | 123/25 A |
| 1,303,187 | 5/1919 | Ferrell | 123/25 A |
| 1,939,302 | 12/1933 | Heaney | 261/DIG. 48 |
| 2,453,595 | 11/1948 | Rosenthal | 123/590 |
| 2,704,535 | 3/1955 | Magui | 261/DIG. 48 |
| 2,732,835 | 1/1956 | Hundt | 261/DIG. 48 |
| 3,648,988 | 3/1972 | Dibert | 261/DIG. 39 |
| 3,857,543 | 12/1974 | McKeen | 261/DIG. 48 |
| 3,860,173 | 1/1975 | Sato | 261/DIG. 48 |
| 4,038,348 | 7/1977 | Kompanek | 261/DIG. 48 |
| 4,176,634 | 12/1979 | Martin | 123/538 |
| 4,227,817 | 10/1980 | Gerry | 261/DIG. 48 |
| 4,344,402 | 8/1982 | Child | 123/538 |
| 4,452,216 | 6/1984 | Patchen | 123/590 |

FOREIGN PATENT DOCUMENTS

| | | | |
|---|---|---|---|
| 2521141 | 11/1976 | Fed. Rep. of Germany | 123/538 |
| 548594 | 10/1922 | France | 261/DIG. 39 |
| 23836 | 2/1979 | Japan | 261/DIG. 39 |
| 96356 | 7/1980 | Japan | 123/537 |

Primary Examiner—Ronald H. Lazarus
Attorney, Agent, or Firm—Melvin R. Stidham

[57] ABSTRACT

A closed circuit vapor system wherein liquid is introduced to an ultrasonic transducer in a vaporizing chamber where it is vaporized and drawn into a preheater chamber and then drawn off by a pump and recirculated back to pass through the heater chamber. In one embodiment, it jets through a venturi to draw off more vapor from the vaporization chamber for heating and recirculation. The dry vapors are drawn off only as needed to meet the engine demands.

5 Claims, 4 Drawing Figures

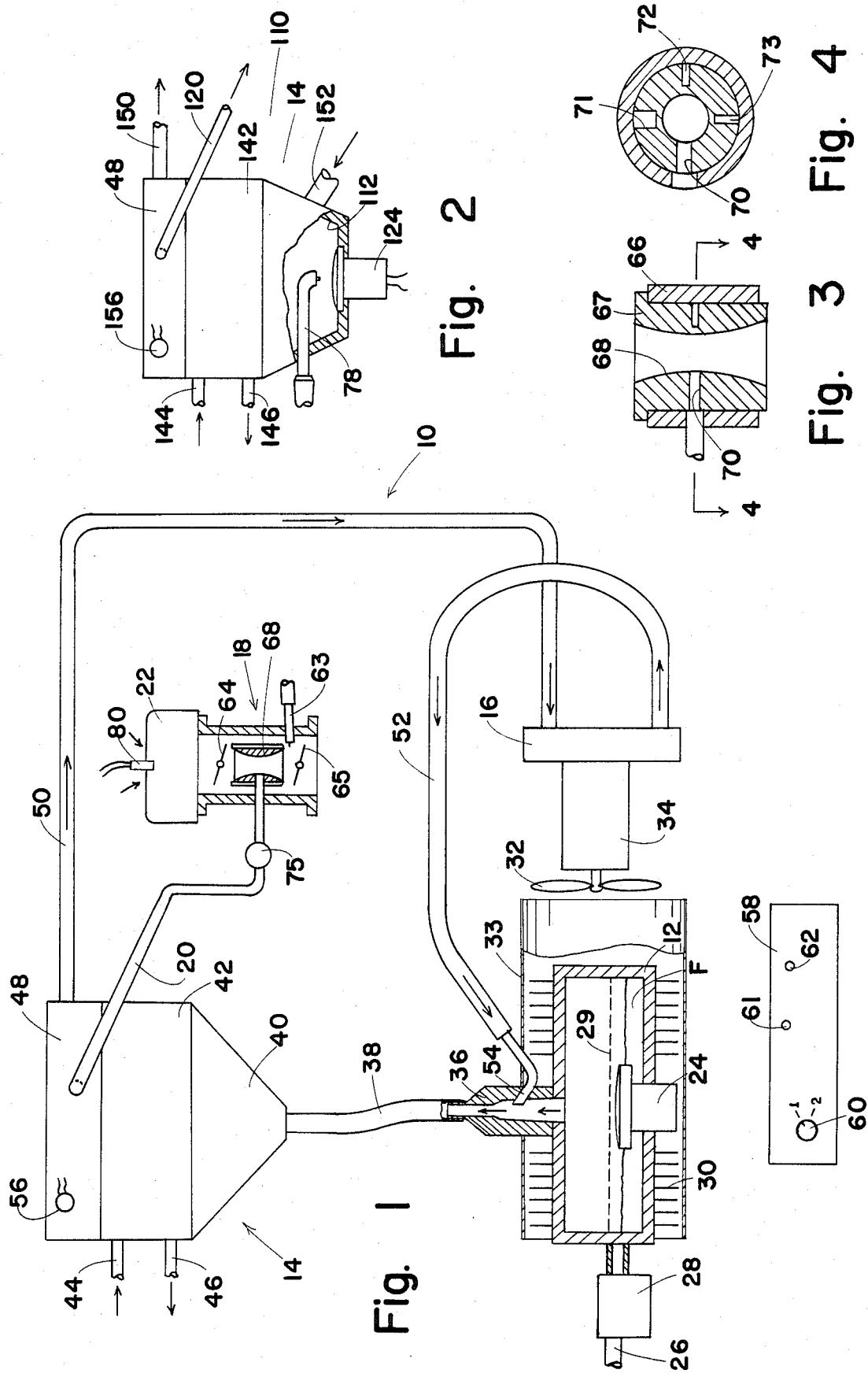

CLOSED CIRCUIT FUEL VAPOR SYSTEM

BACKGROUND OF THE INVENTION

Previous fuel systems for internal combustion engines have contemplated the vaporization of the liquid fuel in order to improve the mixture thereof with air entering the carburetor and some, such as those shown in U.S. Pat. Nos. 4,000,225, 4,105,004 and 4,106,459 have proposed the use of ultrasonic transducers for this purpose. However, there is no known means for controlling the level of vapor density. Moreover, the exposure of a mixture of air and vapor to heated engine components is highly volatile and hazardous.

OBJECTS OF THE INVENTION

It is an object of this invention to provide a means for vaporizing and heating the vapor in a separate system before mixture with air at the engine carburetor.

It is a further object of this invention to provide a closed circuit system for generating, recirculating and increasing the density of vapor in a closed system.

It is a further object of this invention to provide a separate means for generating and recirculating fuel vapor and introducing same into a carburetor having selected orifice and venturi throat to meet the demands of a particular engine.

It is a further object of this invention to provide a closed circuit for generating vapor and maintaining it at a level of density heated above vaporization level so that combustion is more complete and exhaust emissions are minimized.

Other objects and advantages of this invention will become apparent from the description to follow, particularly when read in conjunction with the accompanying drawing.

BRIEF SUMMARY OF THE INVENTION

In carrying out this invention, I provide a closed system having a vaporizing chamber with ultrasonic transducers to generate the vapors, a preheater to heat and dry the vapor and a pump to recirculate the vapors back to a venturi above the vaporizing chamber which draws off and entrains more vapor for reheating and recirculation. Dry vapor is drawn off from the closed system only as needed to meet the demands of an engine.

BRIEF DESCRIPTION OF THE DRAWING

In the drawing:

FIG. 1 is a schematic view of the system embodying features of this invention;

FIG. 2 is a plan view partially broken away showing an alternate form of a main system component;

FIG. 3 is a vertical section through a carburetor embodying features of this invention; and FIG. 4 is a horizontal section taken along line 4—4 of FIG. 3.

DESCRIPTION OF A PREFERRED EMBODIMENT

Referring now to FIG. 1 with greater particularity, the closed circuit fuel vaporizing system 10 of this invention includes as main components a vaporizing chamber 12, a vapor heater 14 and a recirculation pump 16 whereby vaporized fuel is kept in constant circulation from the vaporizer, to the heater and is then recirculated to draw off more vaporized fuel to be preheated. Only as fuel is required to meet the demands of a carburetor 18, is it drawn off through line 20 to be mixed with air drawn in through an air filter 22.

The vaporizer chamber 12 includes an ultrasonic transducer 24 that is vibrated at high frequency to vaporize fuel F which is delivered to it through line 26 and maintained at a suitable level by means of a conventional float type valve 28. A perforated slosh plate 29 may extend across the chamber 12 above the liquid fuel F to restrain it and limit splashing thereof. An alternate fuel delivery system would include a fuel injector directed at the ultrasonic transducer 24 producing an instantaneous conversion of fuel into vapor.

Cooling fins 30 surround the chamber 12 so that the chamber 12 is cooled by means of a fan 32 driven by an electric motor 34 to project air through a shroud 33 or the like. The vaporizer chamber 12 is cooled in order to isolate it thermally from the rest of the system and to ensure that all of the vaporization of fluid is under control of the ultrasonic transducer 24. If the vaporizer chamber 12 were to be heated, as from the vapor heater 14, the fuel could be heated to vaporization temperature and vaporized irrespective of the transducer 24, thereby transcending the controls of the system 10.

From the vaporizer chamber, 12 the vapors are drawn up through a venturi 36 and duct 38 to the lower chamber 40 of the pre-heater. From the lower chamber 40 the vapors rise through closely meshed fins in the heat exchanger section 42, where they are heated by a suitable hot medium, such as hot water from the engine entering at 44 and returning at 46. While the hot engine cooling water is preferred, some other hot medium, such as exhaust gases or lubricating oil from the engine could be used to heat the fuel vapors. From the heat exchanger section 42, the hot, dry vapor rises through to the upper chamber 48 where it is drawn off at 50 by the centrifugal pump 16. From the pump 16 the hot, dry vapor is recirculated at 52 to exit in a jet 54 at the venturi 36, drawing off more vapor from the vaporizing chamber 12 and producing a recirculation of thicker, denser hot vapor.

A gas vapor detector sensor 56, which is located in the upper chamber of the vapor heater 14 is set to detect a pre-set density of vapor and, when that density is reached, the sensor turns off the ultrasonic transducer 24, or the solenoid activated fuel injector as in FIG. 2, while the vacuum pump 16 continues to retain the hot, dry vapor in motion. Consequently, the system 10 of this invention, generates a vapor from a source of fuel 26, heats it at the preheater 14 and retains it within the closed system until required for engine combustion.

At the control panel 58, a main switch 60 is turned against spring tension to a first position to engage the ultrasonic transducer 24 and an indicator light 61 is illuminated to show that the system is generating vapor. Then, when the gas vapor detector sensor 56 is activated to show that the proper level of vapor has been reached, the first warning light 61 is turned off and a second warning light 62 is illuminated to signal to the operator that the system 10 is ready, alerting him to move the main switch 60 to a second position, starting the engine. As the engine starts to turn, ignition being effected through a start-up fuel injector 63 at the carburetor 18, throttle valves 64 and 65 choke intake through the air filter 22, causing hot, dry vapor from the closed system 10 to be drawn off through line 20 to the venturi 68 and then to the intake manifold (not shown) below the carburetor 18 and, as a result, the engine starts.

Once the engine starts, the butterfly valves 64 and 65 are mechanically adjusted to draw fresh air through the venturi 68 causing the engine to increase or decrease speed and power as required. As the hot, dry vapor is depleted from the upper vacuum chamber 48, the gas vapor sensor 56 detects the depletion and activates the transducer 24 causing a balance reserve of hot, dry vapor. When the engine is switched off, all action stops and any vapor in the heater 14 will condense and return through the conduit 38 to the vaporizing chamber 12 until the main switch 60 is once again turned to the first position.

As shown more particularly in FIGS. 3 and 4, the carburetor 18 may include a cup or receptacle 66 into which is dropped a venturi member 67 having a venturi throat 68 of selected size and configuration. Then, extending inward from the sides of the venturi member 67 are bores 70, 71, 72, and 73. In manufacture, none of the bores extends completely through to the throat 66 so that at installation, a venturi member 66 of selected size may be inserted, the desired orifice opening selected and finished to extend completely through and the member dropped in place. In this way, a venturi with orifices may be selected from a selector of, say ten sleeves or ventures with four orifices each, giving a combination of forty engine sizes and elevation ranges.

The closed vapor system 10 of this invention is extremely safe in that there is no exposure to oxygen until the vapor is drawn off and introduced into the carburetor 18. Since the engine draws into the carburetor only hot, dry vapors virtually all of the fuel introduced into the system is consumed by ignition resulting in a substantial fuel economy and a substantial reduction in exhaust ranges.

Referring now to FIG. 2 with greater particularity, a vaporization chamber 112 with transducer 124 may be mounted directly as the bottom section of the heater 114. A fuel injector 78 carries fuel from a suitable source to impinge directly on the ultrasonic transducer 124 for generation of vapor. The vapor rises through the heat exchanger 142 and to the upper chamber 148 where it is drawn off and recirculated to a pump as before and then back through line 152 to the vaporizing chamber 112 for recirculation and further heating. Because the fuel is introduced to the transducer 124 directly, there is no liquid fuel exposed to heat transfer and, hence, no need to isolate the vaporization chamber thermally from the vapor heater 142.

In order to prevent engine head and valve overheating, preheated water may be injected at 80 below the air cleaner 22. This water injector may be controlled by a heat sensor at the base of one of the spark plugs. The injected water is preferably preheated to bring it into balance with the heated dry vapor. To identify the system component 110 with the system 10 of FIG. 1 corresponding components are assigned like reference numerals with the addition of a hundreds digit in front of it.

While this invention has been described in conjunction with preferred embodiments thereof, it is obvious that modifications and changes therein may be made by those skilled in the art to which it pertains without departing from the spirit and scope of this invention, as defined by the claims appended hereto.

What is claimed as invention is:

1. A fuel delivering system for an internal combustion engine comprising:
   a closed vaporizer chamber;
   a closed heat exchanger; and
   a pump;
   duct means connecting said vaporizer chamber, said heat exchanger, said pump and said vaporizer chamber in continuous series to form a closed circuit, oxygen-free vapor supply;
   means for introducing liquid fuel into said chamber;
   an ultrasonic transducer in said chamber for vaporizing liquid fuel;
   a carburetor with a venturi throat therein; and
   a duct connected from said closed circuit just downstream of said heat exchanger to said venturi throat so that said carburetor can draw off heated vapor from said closed circuit to meet engine demand.

2. The system defined by claim 1 including:
   a vapor density sensor located in said circuit downstream of said heat exchanger and operative when a predetermined vapor density is reached to deenergize said ultrasonic transducer.

3. The system defined by claim 2 including:
   a venturi restriction on said duct means just downstream of said sensor; and
   a jet nozzle opening into said venturi to aspirate vapors from said chamber and carry same to said heat exchanger;
   the output of said pump being connected to said jet nozzle.

4. The system defined by claim 1 wherein:
   said carburetor includes a venturi support; and
   a venturi member having a throat of selected size and profile and selected orifice size received in said support.

5. The system defined by claim 1 including:
   means controlled by a heat sensor at the base of a spark plug for injecting hot water into said carburetor.

* * * * *